United States Patent [19]

Kasten

[11] 4,436,543
[45] Mar. 13, 1984

[54] NECK RING MOLD APPARATUS FOR GLASS BOTTLE MANUFACTURE

[76] Inventor: Harold B. Kasten, 5312 Shannon, Godfrey, Ill. 62035

[21] Appl. No.: 384,772

[22] Filed: Jun. 3, 1982

[51] Int. Cl.³ .................... C03B 9/325; C03B 9/48
[52] U.S. Cl. ............................ 65/172; 65/300; 65/361; 65/374.12; 425/525
[58] Field of Search .......... 65/172, 173, 261, 300, 65/361, 374.12; 425/182, 525; 264/533

[56] References Cited

U.S. PATENT DOCUMENTS

| | | | |
|---|---|---|---|
| 3,397,047 | 8/1968 | Rowe | 65/261 X |
| 3,424,569 | 1/1969 | Huebner | 65/172 |
| 4,143,453 | 3/1979 | Taluba | 425/525 X |
| 4,334,852 | 6/1982 | Haubert | 425/525 |

FOREIGN PATENT DOCUMENTS 203851 10/1967 U.S.S.R. .................. 65/374.12

OTHER PUBLICATIONS

Lenel, *Powder Metallurgy, Principles and Applications*, Metal Powder Industries Federation, Princeton, N.J., May 1980, pp. 104, 105, 387, 483.

*Primary Examiner*—Richard V. Fisher
*Attorney, Agent, or Firm*—Jerome A. Gross

[57] ABSTRACT

In apparatus for molding glass bottles having externally threaded necks, neck ring mold halves are given greatly increased life between down time, as well as increased ease of service, by machining away the threaded cavity portion below the well which accommodates the guide ring, so as to provide a somewhat rectangular recess in the bottom portion of each mold half, and inserting and securing in each mold half a sintered metal threaded cavity insert. Where a double lead thread is utilized, the inserts may be identical in each mold half. Great precision is afforded to the inserts when formed oversize by pressing in a direction perpendicular to with the parting plane, the oversized outer edge surface being then machined parallel to the parting plane to fit precisely within the recess.

6 Claims, 4 Drawing Figures

NECK RING MOLD APPARATUS FOR GLASS BOTTLE MANUFACTURE

TECHNICAL FIELD

The present invention relates to apparatus for molding glass bottles having externally threaded necks.

BACKGROUND ART

For many years glass bottles having threaded necks have been molded using a well standardized type of blow molding apparatus. The molds so utilized include a pair of cast metal neck ring mold halves which meet at a vertical parting plane and together form, about a vertical axis in the parting plane, an annulus having a lower central cylindrical well within which a guide ring is accommodated. Beneath the well, and of smaller inner diameter is, in each such conventional mold half, a cavity portion which is to be machined with spiral grooves, to continue from one mold half to the other and thus provide external threads on the bottle necks. It has been difficult to machine the grooves with such precision that those in one mold half will match with those of other mold halves; selective assembly and trial runs may be necessary.

Such mold halves are expected to yield approximately 300 to 350 gross bottles for each two sections of molds before requiring repair or replacement. Need for repair or replacement is limited to the lower cavity portion which has been so machined to provide the bottle threads. Even when the mold halves are new, vertical "splits"—that is, minute vertical grooves—are likely to be present in the bottles formed, leading to rejection of a fairly substantial percent (which may be in the order of 5% to 10%) of the bottles. The cause of such "splits" is not the subject of concensus; they have been thought to be due to glass release agents employed, usually containing sulfur and oil, but may be due at least in part to constituents of the cast iron molds themselves. After substantial use, portions of these release agents are seemingly baked into the grooved surface of the mold, which must then be cleaned by sand blast or vapor blast processes. Both molding the glass bottles and cleaning the molds appear to cause wear of the thread cavities. In the course of time, threads on the bottles will not meet the requisite tolerances. Thus, mold repair or replacement is an expensive and troublesome problem not heretofore met satisfactorily.

DISCLOSURE OF INVENTION

I have discovered that, in contrast with the unitary conventional mold halves made of cast iron and subsequently machined to provide thread grooves below the cylindrical well, the grooved portions may be replaced with sintered metal inserts which, for reasons not thoroughly understood, yield well over twice the number of high quality bottles without any repair or replacement. For example, my initial tests utilizing mold inserts made by sintering powdered cast iron including approximately 3½% carbon and carbon additives, yielded trial runs indicated at least 500 to 800 gross of bottles per mold section, without any objectionable "splits" and without any substantial baked-on contaminants. The bottles so formed were all to accurate tolerance. This compares with the industry standard expectation of only about 280 gross bottles per mold up to discard of the mold halves, with production interrupted by intermediate cleaning and sometimes by repair operations, and subject to 5% to 10% rejects.

The reason for this surprisingly excellent performance is not thoroughly understood; but it appears reasonably certain that the good results are due in part to the precision with which the thread grooves are formed by the molding and the high density of the sintered metal.

In order to accommodate such sintered thread inserts, existing conventional neck ring molds may be reworked by machining in the bottom portion of each mold half a vertical-walled approximately rectangular, rounded-cornered recess extending upward to the lowermost level of the well of the assembled mold half (in so doing machining away the bottom surface of the well portion). The inserts are secured replaceably, so that the relatively expensive mold halves are afforded substantially infinite life merely by replacing the threaded inserts.

THE DRAWINGS

BEST MODE FOR CARRYING OUT THE INVENTION

Figure 1:
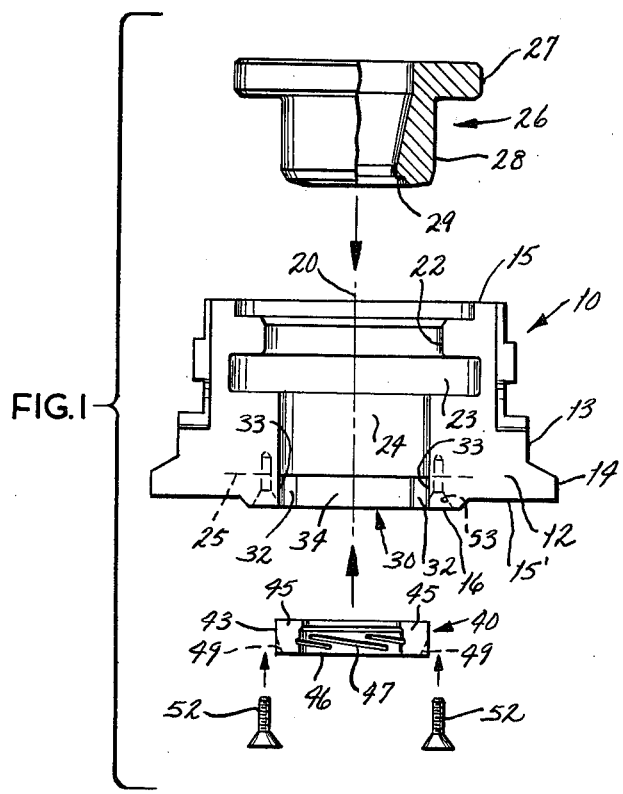
FIG. 1 is an exploded view, partly in section, showing a neck-ring mold half viewed in elevation at its parting plane surface, with a threaded insert half shown downward prior to assembly in the bottom recess of the mold half. A conventional annular guide ring is shown prior to insertion from above and assembled pair of such neck-ring mold halves.

In the exploded view of FIG. 1, a neck-ring mold half generally designated 10 is seen from the side at which its parting plane surface 12 appears in elevation. The neck-ring mold half is machined from a cast-iron casting; its shape is that of a half of a heavy annular body. Its outer surface 13 is conventionally stepped, to be somewhat larger as it slopes to its lower flange 14 than at its top or entrant portion 15; the contour shown being conventional for purpose of assembly and mounting with other equipment conventionally used. Beneath its bottom flange 14 it has a flat annular bottom surface 15' which, progressing inwardly, tapers slightly downward and presents an inner semi-circular surface 16 into which a recess cavity generally designated 30 is machined as hereinafter described.

Figure 4:
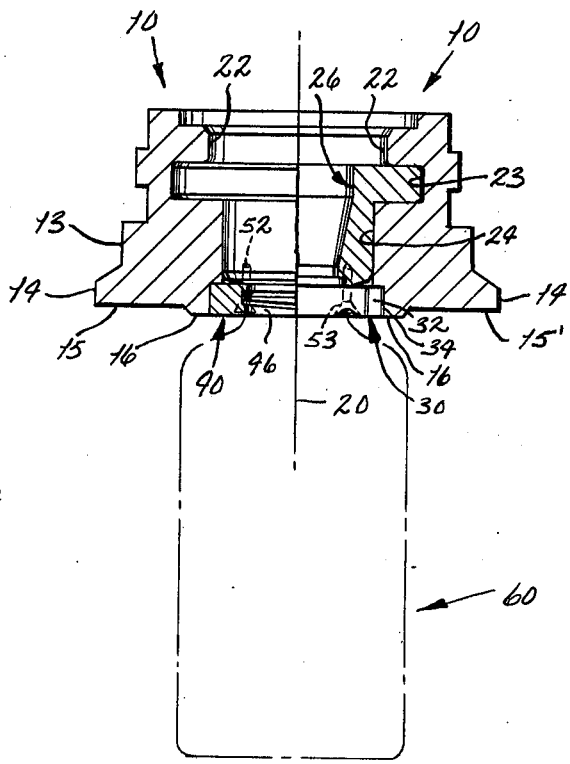
FIG. 4 is a sectional view taken along line 4—4 of FIG. 2 through a pair of neck-ring halves after assembly, except with the mold insert half at the right side omitted to show the cavity in which it is to be inserted. The phantom lines show the position of a bottle being blow-molded.

The inner surface of the neck-ring mold half, above the recess 30, is a many-banded surface of revolution about its central axis 20. An entrant portion 22 is undercut by a deep guide ring mounting groove 23, below which is a semi-cylindrical well portion 24 which is filled by the lower outer surface of a conventional guide ring generally designated 26. The guide ring 26 has a radially-enlarged flange 27 to fit within the mounting groove 23 as shown in FIG. 4. Below its flange 27 its contour is that of a surface of revolution, preferably the cylindrical surface 28. The bottom inner edge surface 29 of the guide ring 26 is tapered upward and forms the top surface of bottles. The well portion 24 reaches to a level 25 of the bottom outer edge of the cylindrical outer surface 28 of the guide ring 26 which level corresponds to the upper level of the recess generally designated 30.

Figure 2:
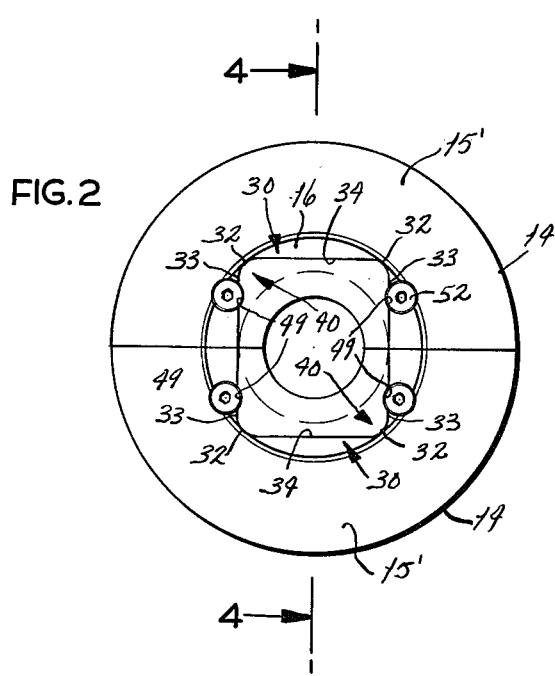
FIG. 2 is a bottom view of an assembled pair of neck-ring halves, after affixation in the recesses of each of a threaded insert as seen in FIG. 1.

The configuration of the recess 30 is best seen by contrasting the parting plane view FIG. 1 with the assembled cross-sectional view of FIG. 4 and with the bottom view FIG. 2. The recess 30 may be described as substantially rectangular as seen in that view, that is, except for the fact that it is open to the well portion 24 and for its rounded corners 32, which fit within the substantially semi-circular lower surface portion 16. Comparing FIG. 1 with FIG. 2, the recess has a pair of parallel side walls 33 spaced from each other at a distance shown to correspond to the diameter of the well 24; and has a wall surface 34 parallel to the parting plane spaced a distance therefrom greater than the radius of the well 24. It is apparent that the spacing of the side wall 33 must be at least equal to the diameter of the well 24 in order that the insert hereinafter referred to will serve as a base to the well 24, leaving, however, sufficient area along the bottom surface 16 for securement of the insert, as herein described.

Figure 3:
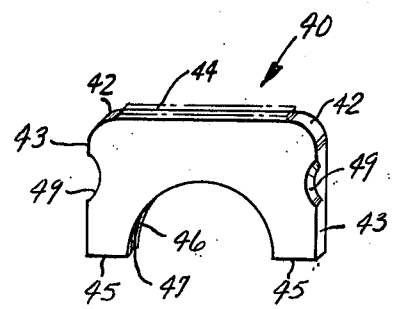
FIG. 3 is an enlarged perspective view of such a threaded insert. The phantom lines along its upper surface show the extent of this surface prior to machining parallel to the parting plane.

The solid line showing of FIG. 3 shows in perspective the finished sintered insert generally designated 40, somewhat enlarged. Its outline is substantially rectangular, much in the sense used in describing the cavity 30, in that when finished it has two rounded corners 42 at the intersection of side surfaces 43, which are parallel to each other, with an outer surface 44 machined or ground to precise dimension parallel to parting plane surface portions 45. The parting plane surface portions 45 are divided by a semi-cylindrical surface 46 having grooves 47 so machined as to form within them double-lead threads on the outer neck surface of a blow-molded bottle 60 shown in phantom lines in FIG. 4. Where the threads to be formed are of the double-lead type, identical inserts may be fitted in both mold halves 10.

The threaded inserts are formed, with their thread grooves 47, by conventional high pressure sintering of powdered metal, preferably powdered cast iron having carbon and carbon additives amounting to approximately 3½% of their content. They are formed by pressing upward in a mold whose top portion has a withdrawable plate, mounting a convex surface having exterior thread portions corresponding to those on the neck of the bottle to be formed. To machine such an exterior-threaded convex surface just once, to form the mold from which all double-lead thread inserts are made, affords much greater precision than the present practice of machining separately the neck concave ring portion of each mold half. The plate from which the convex surface projects forms the parting plane surface portions 45. The powdered metal is introduced and pressed upward from the opposite side 44; high pressure is exerted perpendicular to these parting plane portions. An excess quantity of powdered metal is utilized, so that the article as pressed and thereafter sintered will have an excess portion beyond the plane of the machined surface 44, shown by the phantom lines in FIG. 3. This excess portion is machined or ground off to final dimension after sintering, to achieve uniformity and fit of the outer surface 44 precisely within the recess 30.

For affixation, two small rounded tapering indentations 49 are machined into that surface of the insert 40 which is to be presented downwardly, so that the tapered heads of mounting screws 52, fitted in taper-countersunk bores 53 shown in phantom lines of FIGS. 1 and 4, may overlap the side edges 33 of the insert 40 without projecting beyond the level of the mold half semi-circular surface 16, with which the lowermost surface of the insert 40 is generally co-planar.

On such assembly, as hereinabove described, the sintered ring neck mold halves for double-lead threads will so precisely be formed to be interchangeable; the threaded inserts are formed so precisely that any two ring neck mold halves equipped with the inserts will, on being assembled with each other without any selection process, provide threads in perfect axial alignment and of equal radial height from the neck surface of a bottle. This overcomes a serious deficiency in the prior art, wherein even though the machined thread grooves were within permissible tolerance, a build-up of tolerances would be likely to result in imperfectly formed bottle threads either uneven in depth or axially out of line. The great advantages on use of the present invention have been described above, particularly the long life without need for disassembly, cleaning or repair, and the easy replacement. These results were surprising in view of the long-existing problems of making and using thread forming neck-ring molds.

The present invention further comprises the process of re-working existing neck-ring molds in the following manner: machining, in the bottom portion of each mold half, a vertical walled mold recess extending upward to the lowermost level 25 of the well portion 24, the mold recess to have the shape and dimensions as hereinabove described. Then, after drilling the bores 53, inserts 40 as herein described are affixed in the recesses 30 with screws 52, so as to position their parting plane surface portions 45 in planar alignment with the parting plane surface 12. It has been found that when the conventional ring mold halves require repair, this process may be used to salvage them; and their life with such replaceable inserts will thereafter be infinite.

It is understood that the inserts 40 may be made to somewhat varying dimensions, to fit recesses 30 formed in the bases of ring mold halves of other proportions than those as shown. Further, experimentation with other materials than those disclosed may indicate the usefulness of other powdered metals for the present purpose with characteristics which provide extreme density, advantageous surface characteristics and long life without replacement.

INDUSTRIAL APPLICABILITY

The industrial applicability of the present threaded neck-ring mold inserts is principally for utilization in molds for the necks or outer mouth surfaces of glass bottles. While the insert molding surfaces are generally surfaces of revolution, either cylindrical or sloping, they are interrupted by contour-modifying provisions which mold complementary provisions, either external or indented, on such outer upper surfaces of glass bottles. These contour-modifying provisions may be utilitarian or ornamental. The invention is of unusual advantage in forming double-lead threads or other configurations which are symmetrical on each side of the parting plane. The present inserts afford interchangeability and indefinite life to neck-ring mold halves, long trouble-free life of inserts, easy replacement, and exceptional runs of bottles substantially without rejects.

The embodiments of the invention in which an exclusive property or privilege is claimed are defined as follows:

1. For molding the necks of glass bottles to a desired external configuration,
   neck ring mold apparatus comprising:
   A. a pair of neck ring mold halves having vertical parting plane surfaces extending to bottom surfaces, the said mold halves when mounted with their parting plane surfaces together forming an annulus about a lower well of circular cross-section and having bottom portions, measured from the lowermost end of said well, whose thickness substantially equals the depth of such desired external configuration, the bottom surface of each mold half having formed therein a recess extending therefrom up to the lowermost level of said well, said recess having a pair of side walls spaced from each other at a distance substantially equal to the diameter of said well at its lowermost level, said recess further having a third wall joining said pair of side walls which third wall is parallel to the parting plane at a spacing therefrom greater than the radius of said well at its said lowermost level; and assembled therewith
   B. a pair of replaceable mold inserts each insert being formed of sintered metal, one secured in each said recess and filling same from the lowermost level of said well to the mold half bottom surfaces, each insert extending from said third wall of the recess to the parting plane and presenting, substantially symmetrically thereto, half-round cavity surfaces whose radius is smaller than that of said well, which cavity surfaces are configured complementary to such desired external configuration for the neck of such glass bottles.

2. Neck ring mold apparatus as defined in claim 1, in which
   the desired external neck configuration is that of a double lead thread, and
   the pair of inserts are provided with thread grooves identical to each other.

3. Neck ring mold apparatus as defined in claim 1, wherein
   the said mold inserts are formed by sintering a quantity of sinterable metal formed under pressure directed perpendicular to those surface portions of the inserts which will, on assembly, be presented at the parting plane.

4. Neck ring mold apparatus as defined in claim 3, wherein
   the quantity of sinterable metal, so sintered under pressure, is in excess of that required to fill said recesses, and
   that surface of each insert which is opposite those portions toward which pressure is so directed, is finished after completion of sintering by removing such excess quantity.

5. Neck ring mold apparatus as defined in claim 1, wherein
   the neck ring mold halves are formed of cast iron, and
   the replaceable mold inserts are formed of sintered iron.

6. Neck ring mold apparatus as defined in claim 1, wherein
   each sintered insert is provided with a pair of tapering indentations in its surface which on installation is to be presented outwardly and along edges of said insert remote from said cavity surface thereof,
   whereby said insert may be secured in said recess by the heads of tapered screws mounted in the mold half bottom surface adjacent to the edge of the recess.

* * * * *